(12) United States Patent
Micaelli

(10) Patent No.: US 9,317,027 B2
(45) Date of Patent: Apr. 19, 2016

(54) METHOD OF CONTROLLING A ROBOT

(71) Applicant: Commissariat A l'Energie Atomique Et Aux Energies Alternatives, Paris (FR)

(72) Inventor: Alain Micaelli, Fontenay-aux-Roses (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 51 days.

(21) Appl. No.: 14/350,671

(22) PCT Filed: Oct. 1, 2012

(86) PCT No.: PCT/FR2012/052216
§ 371 (c)(1),
(2) Date: Apr. 9, 2014

(87) PCT Pub. No.: WO2013/054019
PCT Pub. Date: Apr. 18, 2013

(65) Prior Publication Data
US 2014/0257559 A1 Sep. 11, 2014

(30) Foreign Application Priority Data

Oct. 11, 2011 (FR) .................................... 11 59152

(51) Int. Cl.
*G05B 19/19* (2006.01)
*B62D 57/032* (2006.01)
(52) U.S. Cl.
CPC ............. *G05B 19/19* (2013.01); *B62D 57/032* (2013.01); *Y10S 901/01* (2013.01)

(58) Field of Classification Search
CPC ..... B62D 57/032; G05B 19/19; Y10S 901/01
USPC .............................................. 700/245; 901/1
See application file for complete search history.

(56) References Cited

U.S. PATENT DOCUMENTS 7,835,822 B2 * 11/2010 Goswami et al. ............. 700/250
8,145,354 B2 * 3/2012 Goswami et al. ............. 700/250
(Continued)

OTHER PUBLICATIONS

Thijs Mandersloot, et al., "Controlling Velocity in Bipedal Walking: a Dynamic Programming Approach," 2006 6th IEEE—RAS International Conference on Humanoid Robots, Dec. 1, 2006, pp. 124-130.

(Continued)

*Primary Examiner* — Khoi Tran
*Assistant Examiner* — Robert Nguyen
(74) *Attorney, Agent, or Firm* — The Webb Law Firm

(57) ABSTRACT

A method of controlling motion on the ground of a device having at least two legs comprising: obtaining current values of dynamic state variables of the device; optimizing a movement command for the device under constraints while taking account of said current values and of a movement setpoint for the device, said optimization being performed by modeling a movement of the device between a current state and a second state, the device being supported during said movement by at least on a first leg, and then from an instant in which the center of pressure on the ground is changed, at least on a second leg; and applying said movement command; wherein said optimization is performed on the assumption that the gravity potential energy of the device in the second state is a local maximum as a function of time.

14 Claims, 12 Drawing Sheets

(56) References Cited

U.S. PATENT DOCUMENTS

2008/0133053 A1    6/2008    Pratt et al.
2011/0029130 A1*    2/2011    Goswami ............. B62D 57/032
                                                                                        700/250

OTHER PUBLICATIONS

Van Oort and Stramigioli, "Using time-reversal symmetry for stabilizing a simple 3d walker model," IEEE International Conference on Robotics and Automation, Apr. 2007, pp. 4873-4678.

Hyon & Fujimoto, "invariant Manifold of Symmetric Orbots for Globally Optimal Biped Locomotion," IFAC Symposium on Robot Control (2009).

Herdt, et al., "Online Walking Motion Generation with Automatic Foot Step Placement," Advanced Robotics, 24, 719, 2010.

Igor Mordatch, et al., "Robust Physics-Based Locomotion Using Low-Dimensional Planning", ACM Transactions on Graphics, vol. 29, No. 4, Article 71. Jul. 26, 2010.

* cited by examiner

METHOD OF CONTROLLING A ROBOT

CROSS-REFERENCE TO RELATED APPLICATIONS

This application is the United States national phase of International Application No. PCT/FR2012/052216 filed Oct. 1, 2012, and claims priority to French Patent Application No. 1159152 filed Oct. 11, 2011, the disclosures of which are hereby incorporated in their entirety by reference.

BACKGROUND OF THE INVENTION

1. Field of the Invention

The invention comes within the field of robotics, and more precisely the field of methods of controlling a robot possessing a body supported by at least two legs on which it stands and advances.

2. Description of Related Art

Various mathematical methods for controlling the walking of such robots have been described, but they remain imperfect in many respects, given the numerous difficulties that a two-legged robot needs to overcome in order to move effectively even in an environment that is simple (e.g. flat ground without obstacles), and a fortiori in an environment that is complex, e.g. including staircases.

Certain control approaches determine a step period in one way or another. This applies for example to the disclosure of the document "Online walking motion generation with automatic foot step placement", by Herdt et al., Advanced Robotics, 24, 719, 2010, which describes the use of predictive control to generate walking motion for a two-legged robot on the basis of a predefined reference velocity, of freely adapting the placing of the foot, and of constraints relating to the center of pressure of the robot's foot on the ground.

In that document, the robot model used is simple, but it is always for controlling the robot on the basis of a constant step period, and certain authors have developed models that are more complicated, e.g. including hip movements in order to take complex dynamics into account approximating those of a human being.

In particular, Document US 2008/0133053 addresses the stability of a robot that is subjected to a thrust. The robot is modeled by an inverted pendulum including a flywheel for reproducing the effects of angular moment modifications of the body. The authors disclose a control method operating by instantaneous determination of a position on the ground for contact of a leg with the ground, and of an angular moment of the flywheel.

In other approaches, such as for example in the article by Hyon and Fujimoto, IFAC Symposium on robot control 2009, and by Van Oort and Stramigioli, IEEE International Conference on Robotics and Automotion 2007, pp. 4653-4660, it is step length that is determined, while step duration is variable.

Proposals have also been made to use both step duration and step length as control variables. Thus, the document "Robust physics-based locomotion using low-dimensional planning" by Mordatch et al., ACM Transactions on Graphics 2010, 29 (3) discloses a controller defined on the basis of an inverted pendulum model, in which the control parameters include step duration and step location. The equations of motion are applied sequentially for at least two steps and they are polynomial equations. Control parameter continuity is imposed between two consecutive steps. Optimization on a set of at least two steps of the robot is then performed using a statistical method. In a situation without any stage in flight, control is calculated on the basis of two steps, i.e. a sequence made up of a first change of foot, a movement, a second change of foot, a new movement, and finally a third change of step.

Because such a control method applies to a set of at least two steps, it presents the drawback that calculation can require a particularly long length of time, which requires greater computer power and also reduces the reactivity of the system.

The invention seeks to solve those problems in particular, while also reducing the quantity of calculation required.

SUMMARY OF THE INVENTION

A method of controlling motion on the ground of a device having at least two legs, the method comprising:
  an obtaining step of obtaining current values of dynamic state variables of the device;
  an optimization step of optimizing a movement command for the device, optionally under constraints, while taking account of said current values and of a movement variables setpoint for the device, said optimization being performed by modeling a movement of the device between a current state and a second state, the device being supported during said movement by at least on a first leg, and then from an instant in which the center of pressure on the ground is changed, at least on a second leg; and
  an application step of applying said movement command; the method being characterized in that said optimization is performed on the assumption that the gravity potential energy of the device in the second state is a local maximum as a function of time.

Thus, the modeling proposed in the invention is based on a characteristic state of the walking cycle corresponding to a potential energy maximum.

This state always exists for periodic walking gaits, and is characterized by only one constraint on the state variables, as described in detail below.

This state is the intersection of the trajectory of the system with a Poincaré section, i.e. a subspace of the state space, characterized by a constraint on the straight variables.

The control method makes it possible to define control parameters for a two-legged robot in a manner that is accurate and fast, since such a transition model makes it possible to specify equations of motion by analytic processing, in particular by making use simultaneously of step time and length as control variables.

In particular, the control method proposed uses no more than half the number of control variables than in the prior art as described in the article by Mordatch et al.

Poincaré sections are well adapted to studying the stability of cyclical systems, and consequently the movement model used by the invention lends itself better to analyzing control than does the model considered in the prior art, e.g. in the article by Mordatch et al., which models movement between two change-of-foot states.

When constraints are imposed on the positions of the feet, thereby having the consequence of leaving only step duration as a control variable, it is necessary to take two steps into consideration, i.e. two changes of supporting leg between the first and second states, but nevertheless, the control proposed by the invention once more lends itself well to analysis and characterization.

Because of this characterization, it is possible to have better knowledge of the commands, and in particular to define guarantees of convergence.

It is also possible to select in advance suitable gains or parameters for the controller.

It is specified that the gravity potential energy of the device is appropriate in the context of a model of the device.

In a model of the device known as the "inverted linear pendulum" model, a center of mass of the device is subjected to forcing relative to a plane during said movement. In a non-linear model that is an alternative to the inverted pendulum, and that is referred to as the "compass" model, it is the lengths between the center of mass of the device and the feet of the device that are constant.

Preferably, the movement command comprises a position on the ground for contact between a leg and the ground or a time for contact of a leg with the ground, or both.

In an advantageous implementation, said optimization is performed by using a movement model that is linearized on the assumption that the movement follows a polynomial trajectory, e.g. a trajectory that is rectilinear or circular. Calculations are then simplified considerably.

In an implementation, the optimization is performed with the help of a linear quadratic regulator, and alternatively it is performed by model inversion.

Other characteristics of the invention are as follows: the optimization may be performed as a function of a setpoint determined as a function of a trajectory to be followed, and/or as a function of a setpoint that is determined as a function of a velocity to be followed.

The optimization may be performed under a constraint of complying with a friction cone during contact of a leg with the ground.

The optimization may be performed as a function of a setpoint including at least one position of the device or at least one velocity of the device and/or as a function of an average step length setpoint, or an average step period (duration).

Finally, in one model, the potential energy is a function of the distance between the center of mass and the point of contact with the ground of the leg that is in contact with the ground.

The invention also provides an optionally humanoid robot that incorporates a control device performing a control method as set out above.

DETAILED DESCRIPTION OF THE INVENTION

Figure 1:
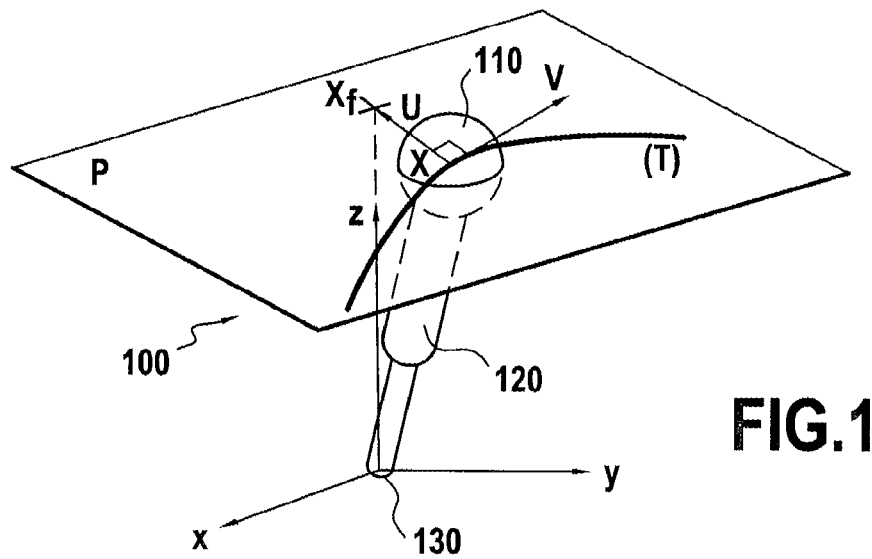
FIGS. 1 and 2 show the robot and movement models used.

FIG. 1 is a diagrammatic view of the physical robot model used in the invention. The robot 100 has a center of mass 110, a leg 120, and a foot 130. The leg 120 connects the center of mass 110 to the foot 130. A second leg is also a component of the robot 100, but it is not shown in FIG. 1. In the mathematical model described below for modeling the robot 100, it suffices to consider only one leg 120.

The robot 100 is modeled in the form of an inverted linear pendulum. On the assumption that one of the feet of the robot is always in contact with the ground, the system finds a simple mathematical expression in the form of the following equation:

$$\ddot{X} = \frac{g}{z_c}(X - X_f) \quad (1)$$

with the following notation:
X: the position of the center of mass 110 in the horizontal plane;
$X_f$: the position of the foot 130 in the same horizontal plane; and
$z_c$: the height of the center of mass 110 when the center of mass 110 is vertically above the foot 130.

In the model used, the trajectory of the center of mass 110 is constrained to remain in a plane complying with the condition $z=z_c$ for $X=X_f$. This plane is determined by the velocity and acceleration vectors of the center of mass at an initial instant. The potential energy of the robot 100 then takes the following form:

$$V = -\frac{1}{2}\omega\|X - X_f\|^2$$

where ω is the characteristic angular frequency of the system, and depends on g and on $z_c$. The legs are variable in length. In FIG. 1, this is represented by a leg 120 that is shown as being telescopic. Alternatively, the length of a leg may vary because of the presence of a knee.

In a variant, the center of mass is constrained to remain on a surface satisfying the condition $z=z_c$ for $X=X_f$.

Integrating differential equation (1) gives behavior as a function of time as follows:

$$\begin{cases} X - X_f = (X_0 - X_f)\cosh(\omega t) + \frac{\dot{X}_0}{\omega}\sinh(\omega t) \\ \frac{\dot{X}}{\omega} = (X_0 - X_f)\sinh(\omega t) + \frac{\dot{X}_0}{\omega}\cosh(\omega t) \end{cases} \quad (2)$$

The subscript 0 indicates an initial value at an instant 0. The variable t represents time.

In the description below, coordinates are expressed as a function of the following change of variables, defining the state variables of the system in simple manner:

$$\begin{cases} U = X - X_f \\ V = \dfrac{\dot{X}}{\omega} \end{cases} \quad (3)$$

The vector U is a two-dimensional vector defined by the positions of the center of mass 110 and of the foot 130. The two-dimensional vector V represents the velocity of the center of mass in the horizontal plane, with this being expressed relative to the angular frequency.

Figure 23:
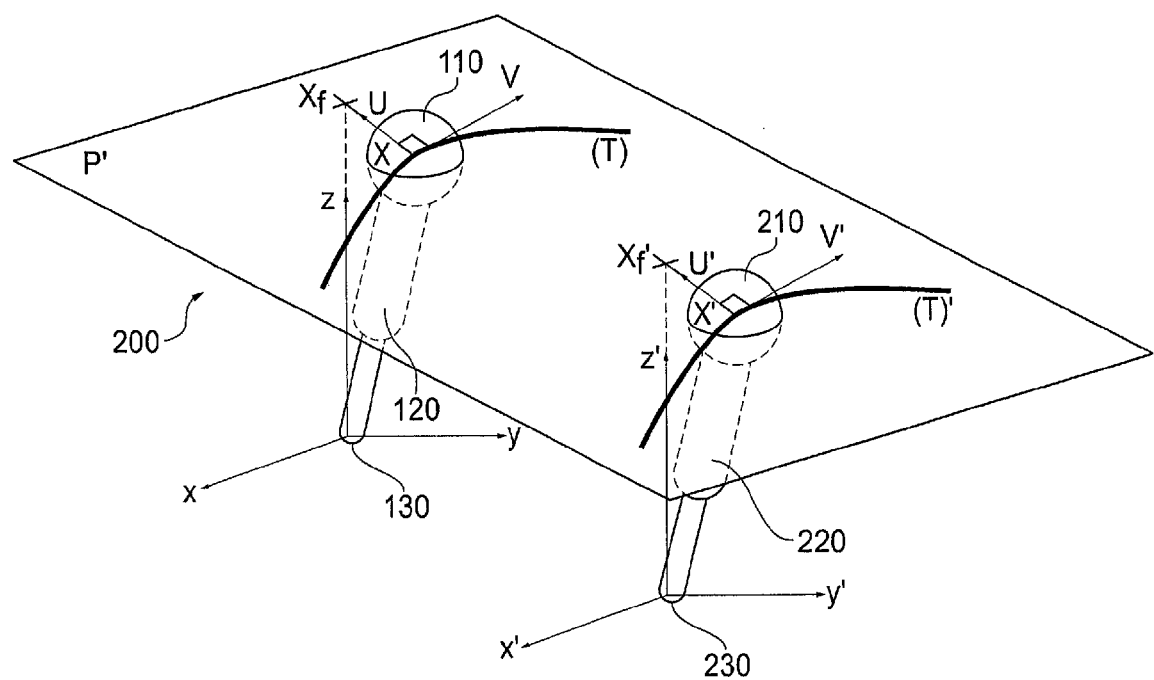
FIG. 23 is a diagrammatic view of the physical robot model used in the invention having multiple legs.

FIG. 23 is a diagrammatic view of the physical robot model used in the invention having multiple legs. In addition to having a first leg with like parts as described in FIG. 1, a robot 200 has a center of mass 210, a leg 220, and a foot 230. The leg 220 connects the center of mass 210 to the foot 230. As described in equation 1, X' represents the position of the center of mass 210 in the horizontal plane; $X_f'$ represents the position of the foot 230 in the same horizontal plane; and $z_c'$ represents the height of the center of mass 210 when the center of mass 210 is vertically above the foot 230. The vector U' is a two-dimensional vector defined by the positions of the center of mass 210 and of the foot 230. The two-dimensional vector V' represents the velocity of the center of mass in the horizontal plane, with this being expressed relative to the angular frequency. If, as mentioned above with respect to FIG. 1 that shows the system 100 at the instant $t_2$, i.e., in a state of maximum potential energy, the system 100 is moving along the trajectory T in the plane P. FIG. 23 shows a trajectory T and T' in the plane P.

Figure 2:
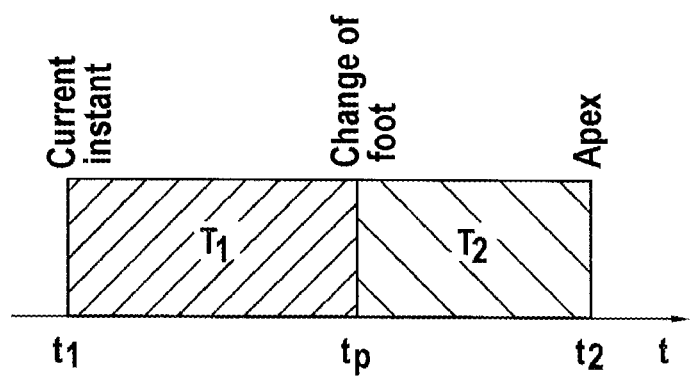

FIG. 2 shows the transition model used in the invention. FIG. 2 shows how the system varies over time. Three instants are shown. Firstly, there is the instant $t_1$, which corresponds to the current instant. Thereafter, an instant $t_p$ is shown. This is an instant when a foot is placed on the ground and simultaneously the other foot loses contact with the ground (referred to as a change of foot, and in general manner this is merely a change in the center of pressure on the ground). Finally, a third instant $t_2$, later than instants $t_1$ and $t_p$ is shown. This instant is an instant of maximum potential energy for the system 100 (referred to as the "apex"), where the derivative of the potential energy v is zero, thus imposing the following equality:

$$U^T V = 0$$

The duration between the instants $t_1$ and $t_p$ is written $T_1$. The duration between the instants $t_p$ and $t_2$ is written $T_2$.

The transition model shown in FIG. 2 relates to the transition from a first state of the system 100 (instant $t_1$), to a second state of the system 100, in which the potential energy is at a maximum (instant $t_2$), these two instants being separated by a single change of foot in contact with the ground (instant $t_p$).

If the states at the beginning and the end of the transition are written using state variables having the subscripts 1 and 2, and if the following notation is used:

$\Delta X_f$: the vector between two successive foot placement locations; and

S and C: the hyperbolic sine and cosine functions respectively;

then the fact that the state variables at the foot-change instant (or ground pressure center change instant) are equal imposes the following equations:

$$\begin{cases} X_{f_0} + C_{T_1} U_0 + S_{T_1} V_0 = X_i = X_{f_1} + C_{T_2} U_1 - S_{T_2} V_1 \\ S_{T_1} U_0 + C_{T_1} V_0 = \dfrac{\dot{X}_i}{\omega} = -S_{T_2} U_1 + C_{T_2} V_1 \end{cases} \quad (4)$$

These equations make it possible to obtain the following model representing the transition between the two states:

$$\begin{cases} U_1 = C_{T_1+T_2} U_0 + S_{T_1+T_2} V_0 - C_{T_2} \Delta X_f \\ V_1 = S_{T_1+T_2} U_0 + C_{T_1+T_2} V_0 - S_{T_2} \Delta X_f \end{cases} \quad (5)$$

If, as mentioned above, the instant $t_2$ is an instant of maximum potential energy, and is therefore characterized by the condition $U^T V = 0$, then if $T_1$ and $\Delta X_f$ are used as control variables, the control state has three dimensions and the system is controllable.

FIG. 1 shows the system 100 at the instant $t_2$, i.e. in a state of maximum potential energy, while the system 100 is moving along the trajectory T in the plane P.

Figure 3:
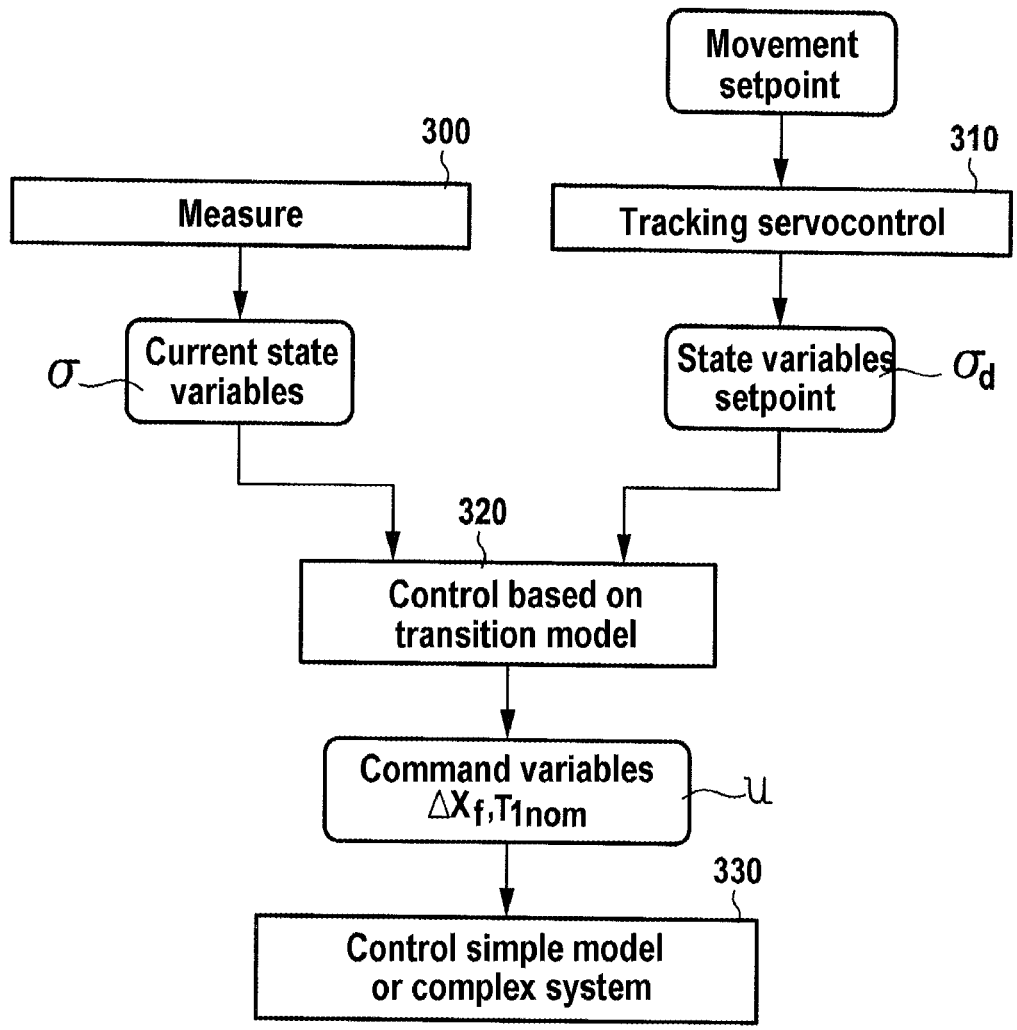
FIG. 3 is a general flow chart of a method of the invention.

The control method of the invention is shown in FIG. 3. This method comprises firstly a step 300 of measuring the current values σ of state variables. In various embodiments of the invention, this may be done using various sensors. The robot also decides the plane P in which it is desires to cause its center of mass 100 to travel, as a function of the current values σ.

Furthermore, a movement setpoint is determined for the system, and during a step 310 of processing the setpoint by tracking servo-control, the setpoint is transformed into a state variable setpoint $\sigma_d$.

During a step 320, the state variable setpoint $\sigma_d$ is processed by a controller relying on the transition model shown in FIG. 2. The controller 320 produces control variables 𝒱 which are used during a step 320 to control the robot 100 itself as a simple model or as setpoints for a complex model of the system.

Once the command has been applied, the process begins again with steps 300 and 310.

Figure 4:
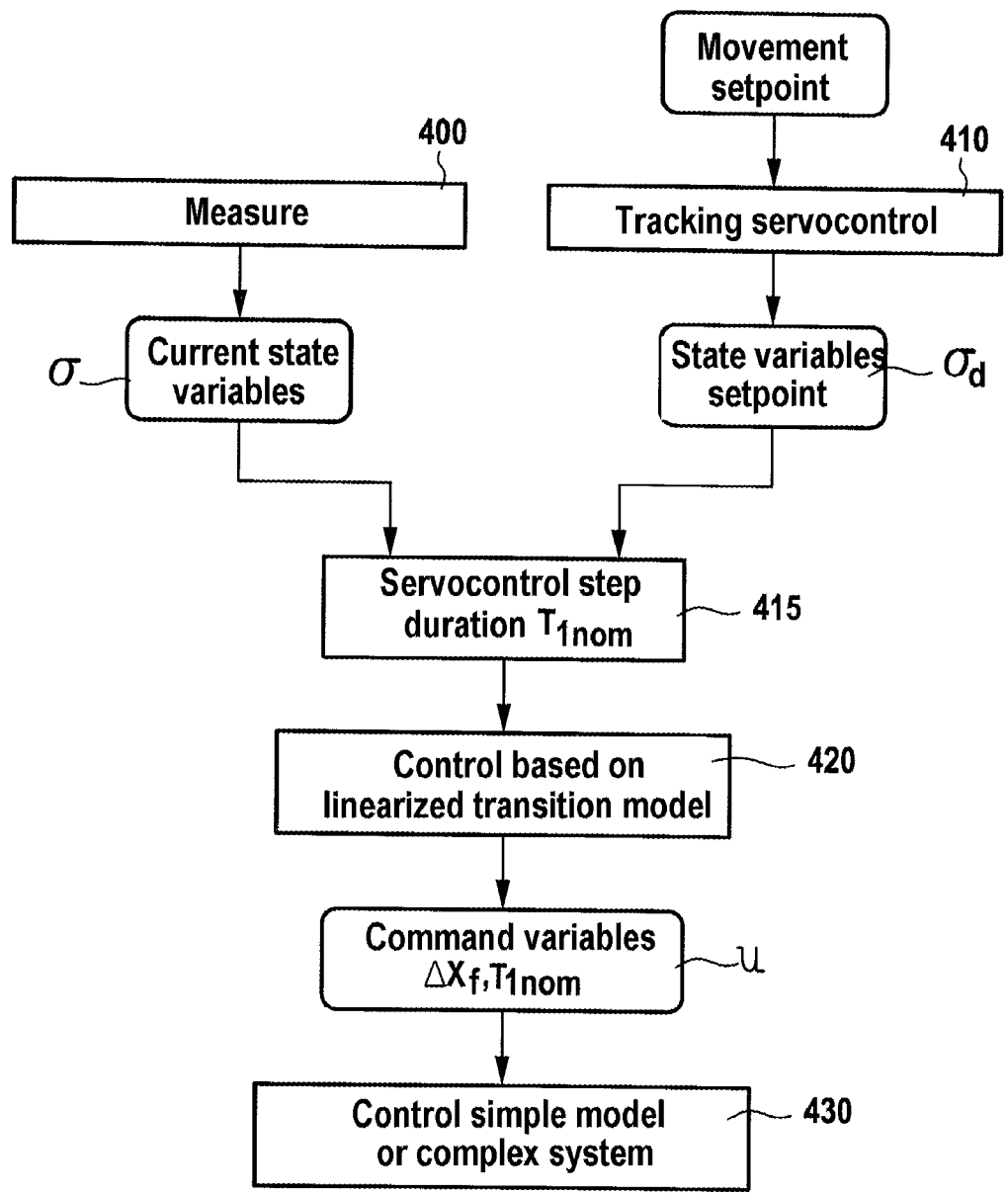
FIG. 4 shows a first implementation of the invention.

With reference to FIG. 4, there is shown a first detailed implementation of the invention. A trajectory to be followed is defined beforehand, in the form of a movement setpoint.

The method begins with a step 400 of measuring the current values σ of the state variables.

A projection step 410 using the movement setpoint also serves to define a velocity vector V state variable setpoint $\sigma_d$).

The projection of step 410 consists in defining the velocity vector (state variable setpoint $\sigma_d$) as a function of the difference between the current position of the robot 100 and a position considered as corresponding to this current position on the trajectory. The position of the robot 100 is taken as being the average of the positions of the center of mass of the robot 100 at two successive maximum potential energy states. The position along the trajectory corresponding to the position of the robot 100 is taken as being an orthogonal projection of the position of the robot 100 onto the trajectory.

In particular when the trajectory is a straight line, the projection is an orthogonal projection onto the line. When the trajectory is a circle, the projection onto the circle is performed along a radius of the circle.

The velocity vector V and the current values σ are then used by a controller in a servo-control step 420 on the basis of a linearized transition model, derived from the model described above in equations (5).

Once the command has been applied during a step 430, the process restarts with steps 400 and 410.

The servo-control step 420 performed by a controller on the basis of a linearized transition model is performed on the basis of linearization assumptions whereby, in one implementation, the movement of the robot 100 is quasi-rectilinear, and its gait is symmetrical.

Under these assumptions, a solution to the system of equations (5) is given by:

$$\begin{cases} U_1 = -U_0 \\ V_1 = V_0 \\ T_2 = T_1 \end{cases} \quad (6)$$

The system of equations (5) can then be written as a function of the nominal command $\Delta X_f$, in the following form:

$$\Delta X_{f_{nom}} = 2(C_{T_1}U_0 + S_{T_1}V_0) \quad (7)$$

By introducing a small variation in the command $X_f$, written $\delta X_f$, the system of equations (5) is written as follows:

$$\begin{cases} U_1 = -C_{T_1-T_2}U_0 - S_{T_1-T_2}V_0 - C_{T_2}\delta\Delta X_f \\ V_1 = S_{T_1-T_2}U_0 + C_{T_1-T_2}V_0 - S_{T_2}\delta\Delta X_f \end{cases} \quad (8)$$

The condition $U^t V = 0$ applied at instant $t_2$ gives the following expression:

$$\delta T_2 = \delta T_1 - \frac{1}{\omega} \frac{(S_T U_0 - C_T V_0)^t}{\alpha_0^2 + \beta_0^2} \delta \Delta X_f \quad (9)$$

This mathematical processing enables the transition model of equations (5) to be expressed in a linearized form, as shown below:

$$\begin{cases} \delta U_1 = -\delta U_0 - V_0 \omega \delta T_1 + V_0 \omega \delta T_2 - C_{T_{nom}} \delta \Delta X_f \\ \delta V_1 = \delta V_0 + U_0 \omega \delta T_1 - U_0 \omega \delta T_2 - S_{T_{nom}} \delta \Delta X_f \end{cases} \quad (10)$$

During step 420, the controller used performs local servo-control of the linear quadratic regulator (LQR) type. The model is modified on each step as a function of the state of the preceding command.

Initialization of the controller 420 comprises a preliminary step 415 of calculating a nominal command $T_{1nom}$ by additional servo-control as a function of a desired average step length $Step_{av}$. More precisely, the step duration is calculated as a function of the current velocity $V_0$ as follows:

$$T_{1nom} = \frac{\operatorname{asinh}\left(\frac{Step_{av}}{2\|V_0\|}\right)}{\omega} \quad (11)$$

Figure 5:
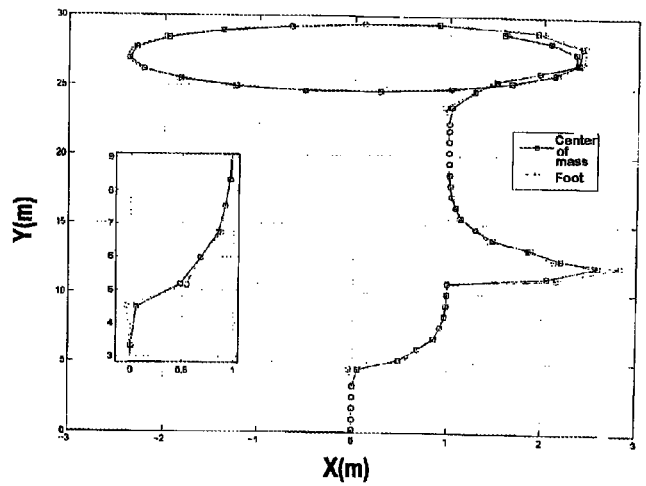
FIGS. 5 to 7 show results relating to simulating a first movement of a robot in the first implementation of the invention.
Figure 6:
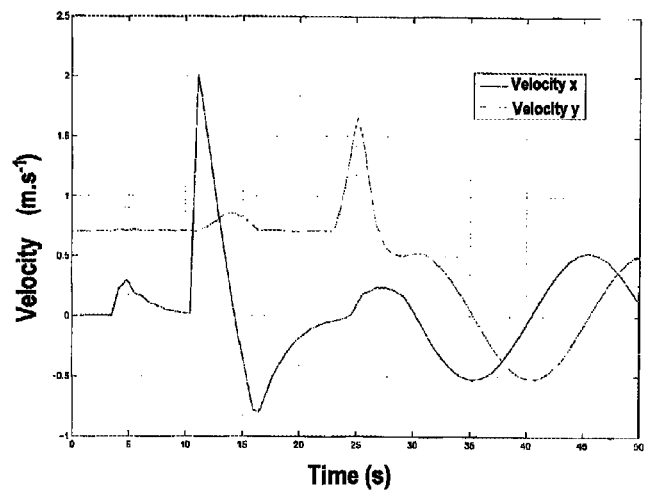
Figure 7:
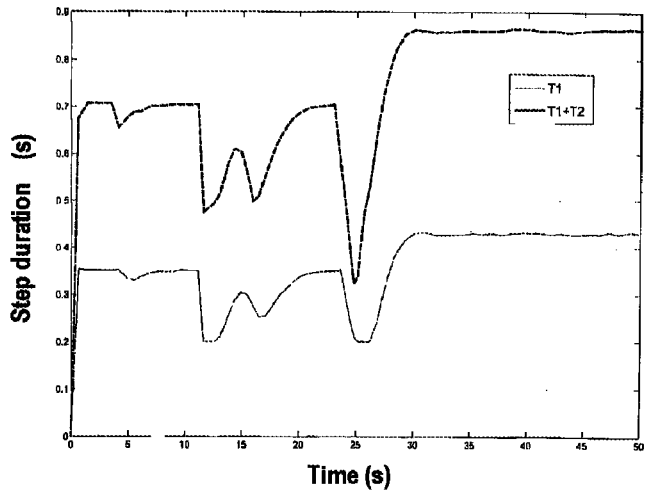

With reference to FIGS. 5 to 7, there can be seen the results of a robot 100 using the control method of FIG. 4.

The angular frequency is equal to 3 per second (s$^{-1}$). The step duration $T_1+T_2$ is constrained to lie in the range 0.2 seconds (s) to 0.8 s, and the step length $\Delta X_f$ is constrained to lie in the range 10 centimeters (cm) to 1.2 meters (m). The control variables $\Delta X_f$ and $T_1$ constitute the control variables $\mathcal{V}$. The mass of the robot is 70 kilograms (kg).

The following setpoint is defined: starting from a point having coordinates (0, 0), a constant velocity of 0.7 meters per second (m·s$^{-1}$) in the direction y is requested of the robot 100 for a duration of 3 s. Then, a straight line perpendicular to the direction of the preceding velocity is to be reached and followed at a velocity of 0.7 m·s$^{-1}$ for 20 s. A lateral disturbance equivalent to 700 newtons (N) for a duration of 0.2 s is applied when the robot 100 reaches the middle of the above-mentioned line. Finally, the robot is requested to travel along a circle of radius 2 m at a velocity of 0.5 m·s$^{-1}$ for 27 s.

FIG. 5 shows the successive positions of the center of mass 110 and of the foot 130. It can be seen that the lateral disturbance leads to an excursion of about 3.5 m. FIG. 6 shows horizontal velocities along the two axes. FIG. 7 shows the step duration of the robot while it is moving, in the form of graphical representations of $T_1$ and of $T_1+T_2$.

Figure 8:
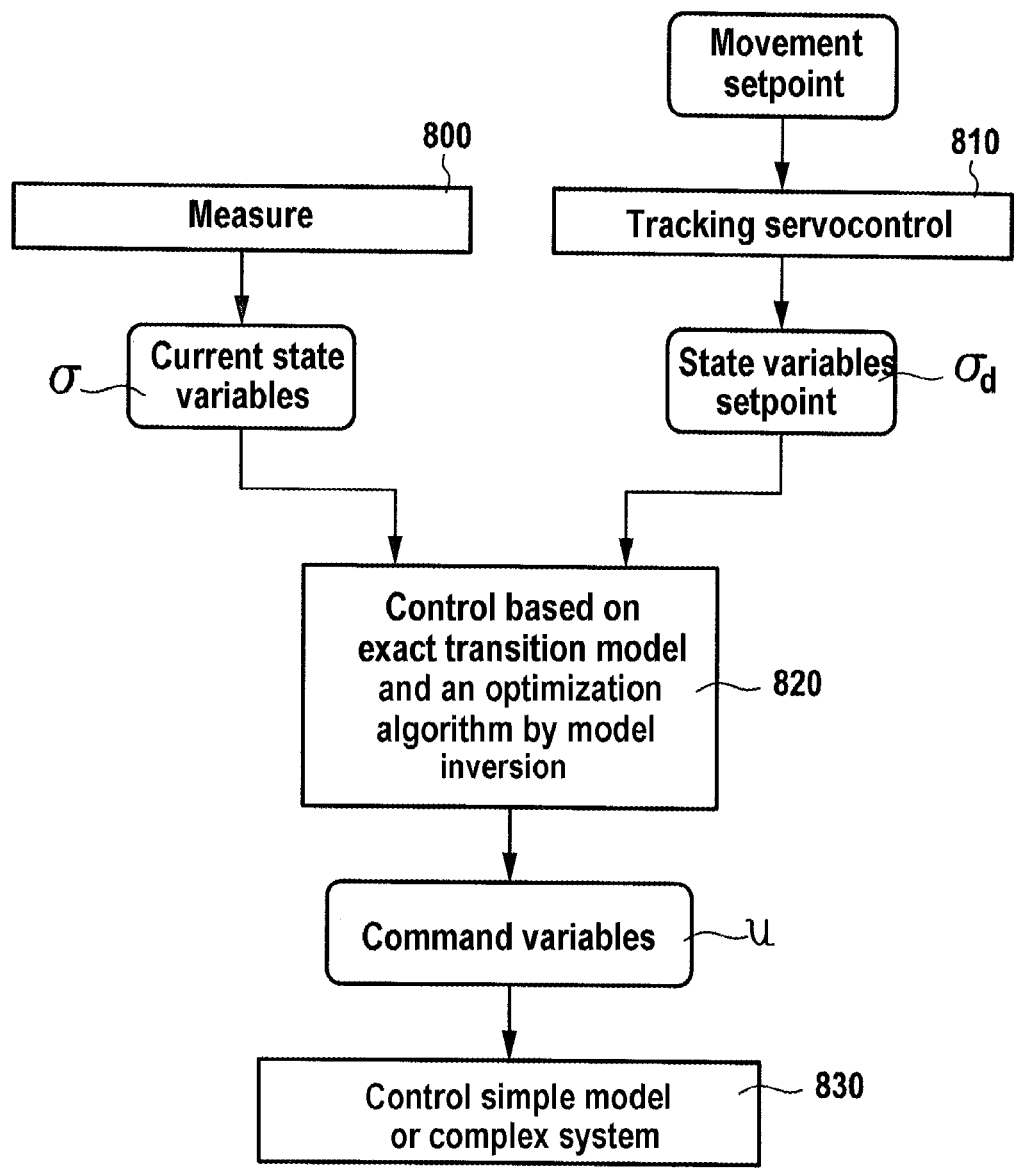
FIG. 8 shows a second implementation of the invention.

FIG. 8 shows another implementation of the invention.

Initially a step 800 of measuring the current values of the state variable σ is performed.

A state variable setpoint identical to that defined in step 400 in the implementation of FIG. 4 is defined in parallel during a projection step 810. The step 810 is similar to the projection step 410 of the implementation shown in FIG. 4.

This projection step makes it possible to calculate a setpoint velocity V, and a setpoint position vector U. These two state variables constituting a state variable setpoint $\sigma_d$ are used by a controller as a setpoint for a servo-control step 820. The controller used relies on the transition model defined in equations (4) in its exact form, and makes use of an algorithm for inverting the model.

The optimization criterion for the inversion of the model is then taken to be equal to:

$$\frac{1}{2}\left( \|U_d - U_1\|_{Q_U}^2 + \|V_d - V_1\|_{Q_V}^2 \right)$$

where $U_d$ and $V_d$ are the desired state variables, and where $Q_U$ and $Q_V$ are weighting matrices.

In this optimization, the system of equations (5) is used to provide inequality constraints, and the step duration, the positioning of the foot, and the characteristics of the ground may be used as inequality constraints. The variables that are extracted are the magnitudes $T_1$, $T_2$, and $\Delta X_f$. Optimization is performed over one step of the robot 100.

The constraint relating to the potential energy maximum at instant $t_2$ is written in the form:

$$[\|C_{T_1}U_0 + S_{T_1}V_0 - \Delta X_f\|^2 + \|S_{T_1}U_0 + C_{T_1}V_0\|^2] S_{2T_2} + 2[C_{T_1}U_0 + S_{T_1}V_0 - \Delta X_f]^t [S_{T_1}U_0 + C_{T_1}V_0] C_{2T_2} = 0 \quad (12)$$

which amounts to:

$$T_2 = \frac{1}{2\omega} \ln \frac{\|(U_0 - V_0)(C_{T1} - S_{T1}) - \Delta X_f\|}{\|(U_0 + V_0)(C_{T1} + S_{T1}) - \Delta X_f\|} \quad (13)$$

The control variables $T_1$ and $\Delta X_f$ (written $\mathcal{V}$) are then used during a step 830 for controlling a complex model of the robot 100 or the robot 100 itself.

Once the command has been applied, the process restarts at steps 800 and 810.

Figure 9:
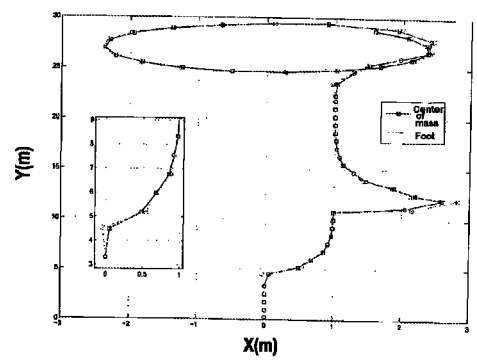
FIGS. 9 to 11 show results relating to simulating the same first movement of a robot, this time in the second implementation of the invention.
Figure 10:
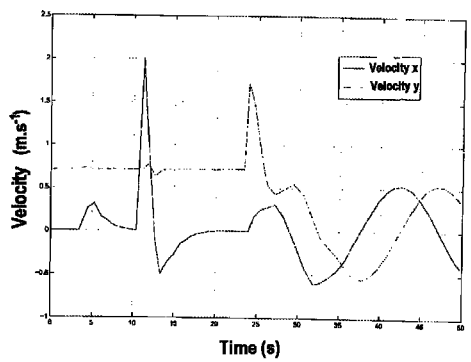
Figure 11:
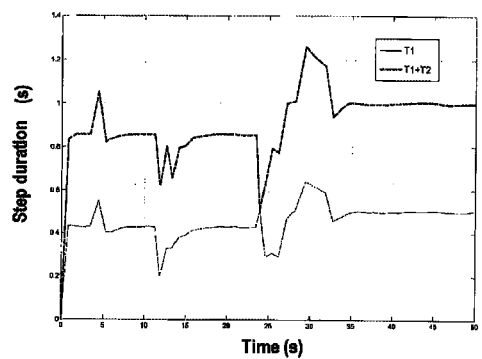

With reference to FIGS. 9 to 11, there can be seen the results of the robot 100 moving under the control of the method shown in FIG. 8.

FIG. 9 shows the trajectory of the robot 100, FIG. 10 shows its horizontal velocities along the two axes, and finally FIG. 11 shows the step duration during the travel of the robot.

The setpoint is the same as that shown in the scenario of FIGS. 5 to 7. In FIG. 9, it can be seen that the method using a non-linear control model provides a faster response to the disturbance, since the lateral excursion is less than 2 m, unlike that which is observed in FIG. 5.

Figure 12:
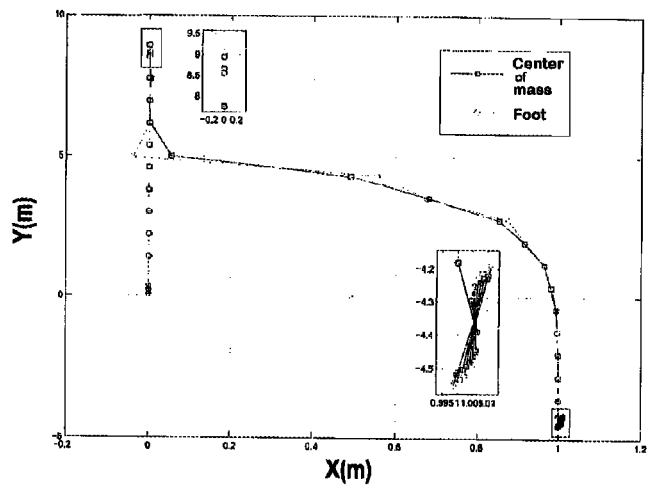
FIGS. 12 to 14 show results relating to simulating a second movement of a robot in the second implementation of the invention.
Figure 14:
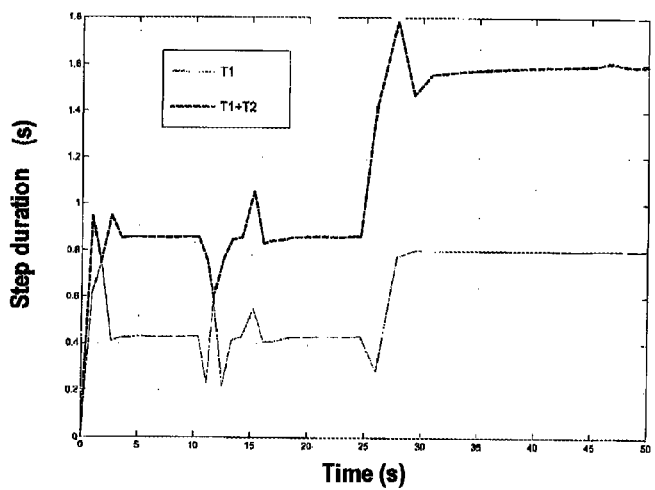

With reference to FIGS. 12 and 14, there can be seen the results relating to the movement of the robot 100 controlled by the method of FIG. 8, but this time with a different setpoint.

The setpoint used this time is as follows: starting from zero velocity, the robot is to reach a velocity of 0.7 m·s$^{-1}$ while remaining on the straight line x=0 until time t=10 s. Thereafter, the robot is to go backwards along the same straight line until t=14 s. Finally, it is to follow the straight line x=1 m at the same velocity until t=24 s, at which instant it is requested to stop.

Figure 13:
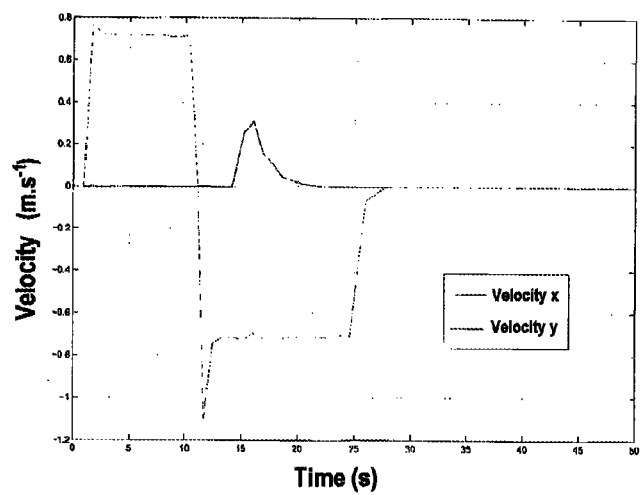

FIG. 12 shows the trajectory of the robot. The inserts are enlargements of zones where the robot has turned around or stopped. FIG. 13 shows how its velocity varies along the two axes over time. Finally, FIG. 14 shows how its step length varies as a function of time.

Figure 15:
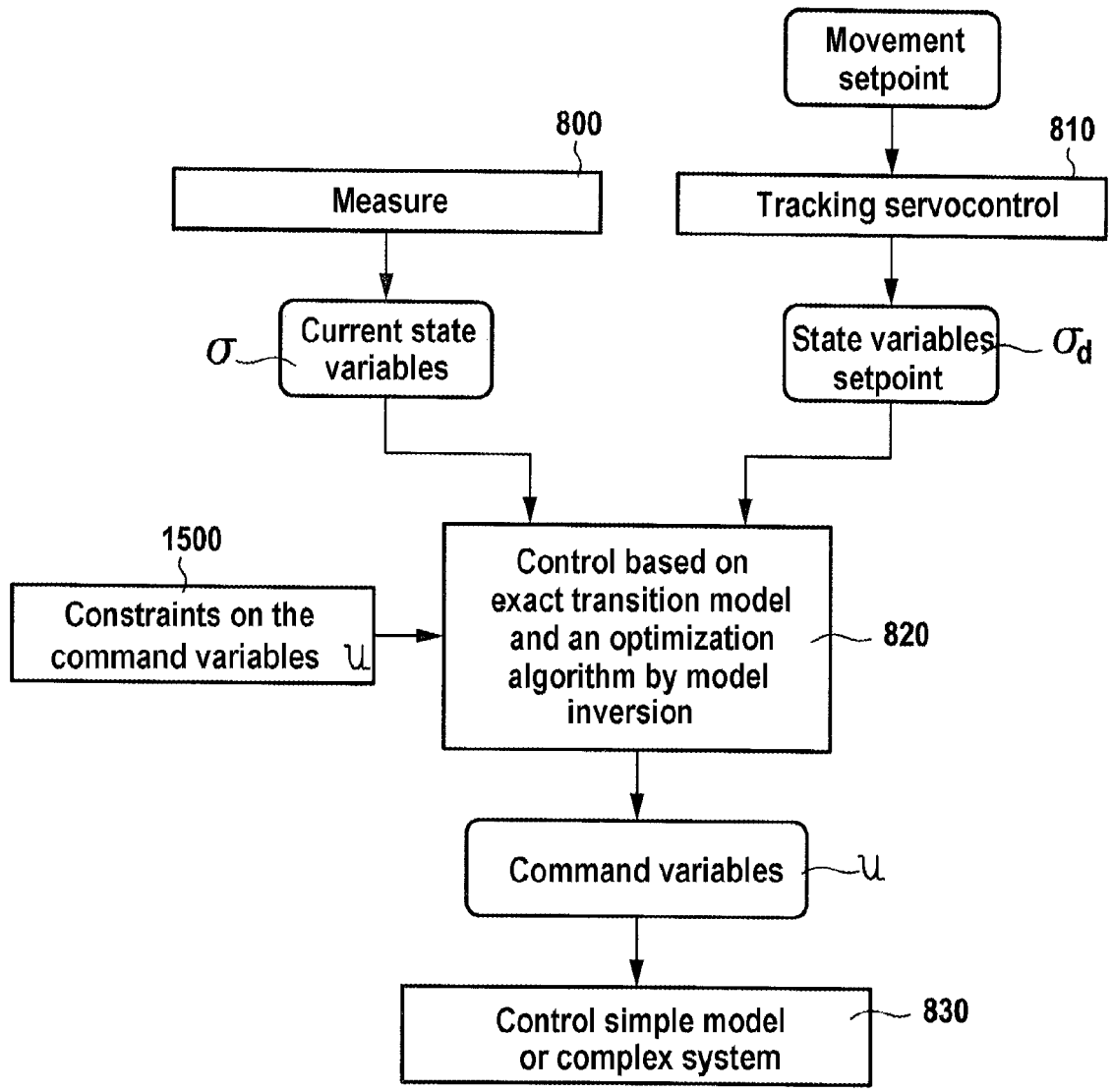
FIG. 15 shows a variant of the second implementation of the invention.

FIG. 15 shows a control method of the invention that differs from that shown in FIG. 8 by introducing constraints 1500 that relate to the control variables $\mathcal{V}$ associated with the environment in which the robot moves.

These are step length constraints associated with the presence of a staircase.

In one scenario, the robot moves along the staircase following a straight line at a velocity of 0.4 m·s$^{-1}$ while it is being pushed forward by applying a disturbance equivalent to 175 N for 0.2 s, and then laterally by applying a disturbance equivalent to 500 N for 0.2 s.

Figure 16:
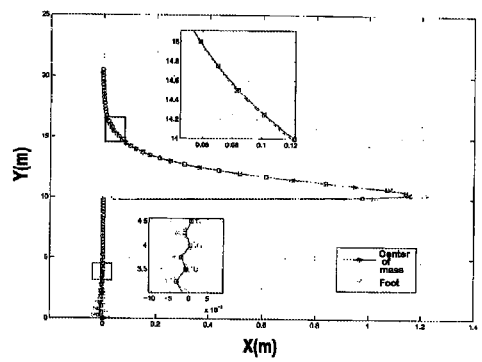
FIGS. 16 to 18 show results relating to simulating a third movement of a robot in the second implementation of the invention.
Figure 17:
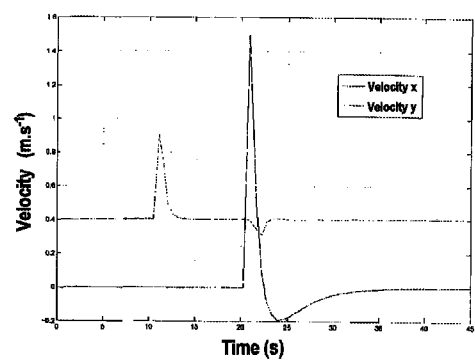
Figure 18:
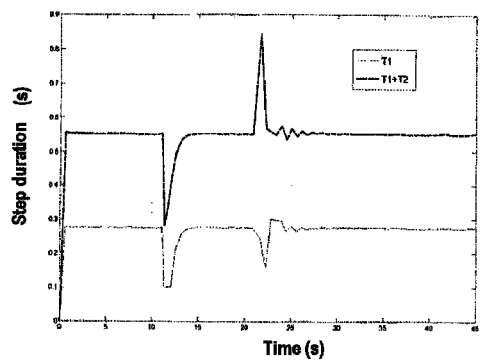

FIGS. 16 to 18 show the results obtained with the FIG. 15 control method. The step length is constrained to the value 0.5 m along the direction y, and the time $T_1$ is constrained to lie in the range 0.1 s to 0.8 s. Thus, compared with the preceding simulations, the step duration may be shorter.

FIG. 16 shows the movement of the robot 100 in a plane. Inserts are included to show that the constraints for a constant step length in the direction y is complied with.

FIG. 17 shows the variation in velocity along the two axes as a function of time. Finally, FIG. 18 shows the step duration of the robot as a function of time.

Figure 19:
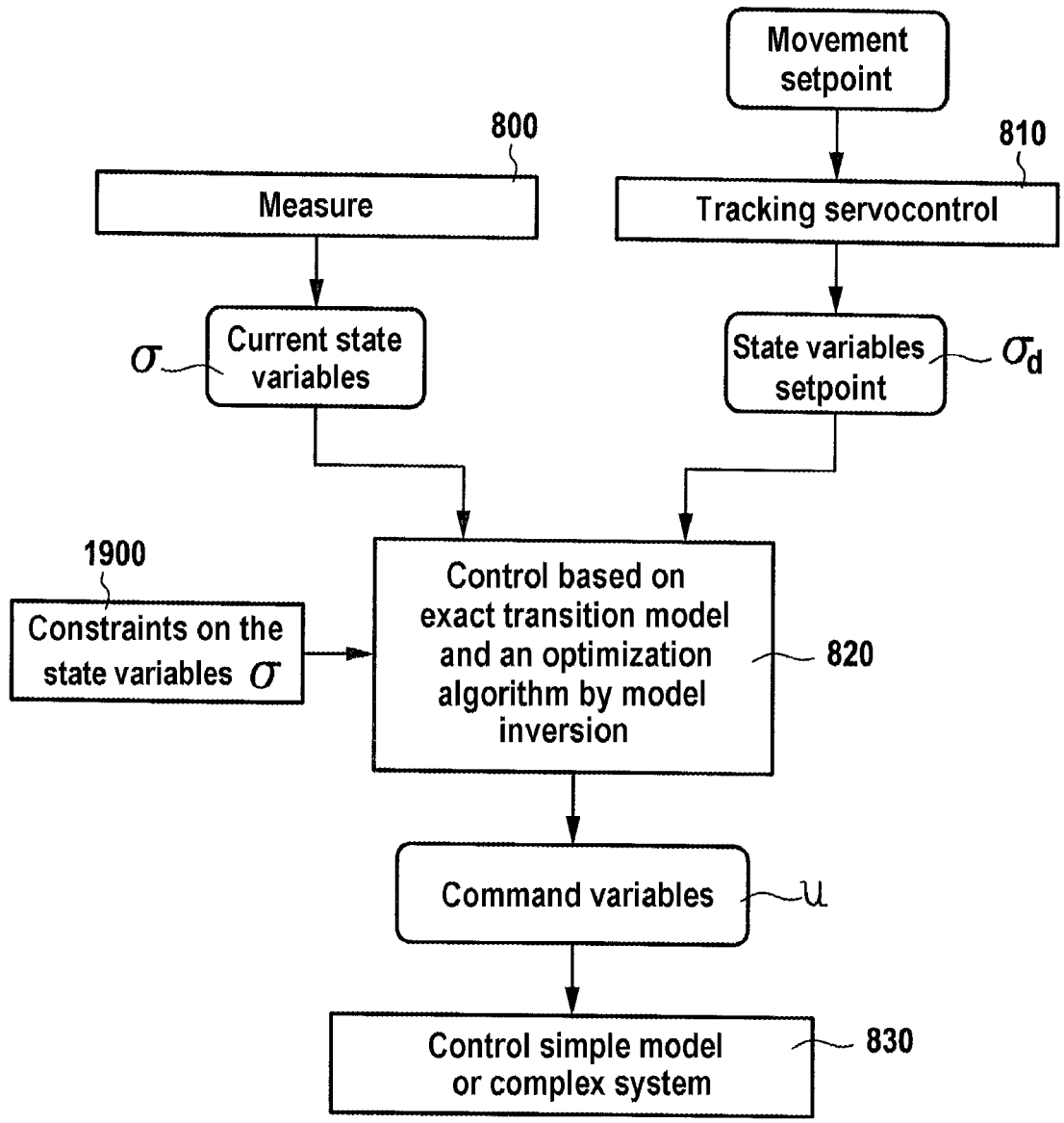
FIG. 19 shows another variant of the second implementation of the invention.

FIG. 19 shows a robot control method of the invention including constraints 1900 relating to the state variable σ. These constraints in this example are associated with the friction characteristics of the ground. They are introduced via the controller in step 820.

The constraints associated with the friction characteristics of the ground are introduced on the assumption that the instant at which these constraints need to be satisfied is the instant at which the foot in contact with the ground changes.

Two series of conditions are then introduced into the model. They are expressed in the following forms:

$$\begin{cases} U_1^- = C_{T_1} U_0 + S_{T_1} V_0 \\ V_1^- = S_{T_1} U_0 + C_{T_1} V_0 \end{cases} \quad \text{Equations 14}$$

$$\begin{cases} U_1^+ = C_{T_1} U_0 + S_{T_1} V_0 - \Delta X_f \\ V_1^+ = S_{T_1} U_0 + C_{T_1} V_0 \end{cases} \quad \text{Equations 15}$$

in which the superscripts "−" and "+" represent respectively the instants before and after the change of foot in contact with the ground. It follows that to ensure that the contact forces lie within the friction cone defined by the coefficient of friction μ, the following constraints must be satisfied:

$$\begin{cases} \omega^2 \|U_1^-\| \le \mu g \\ \omega^2 \|U_1^+\| \le \mu g \end{cases} \quad (16)$$

Figure 20:
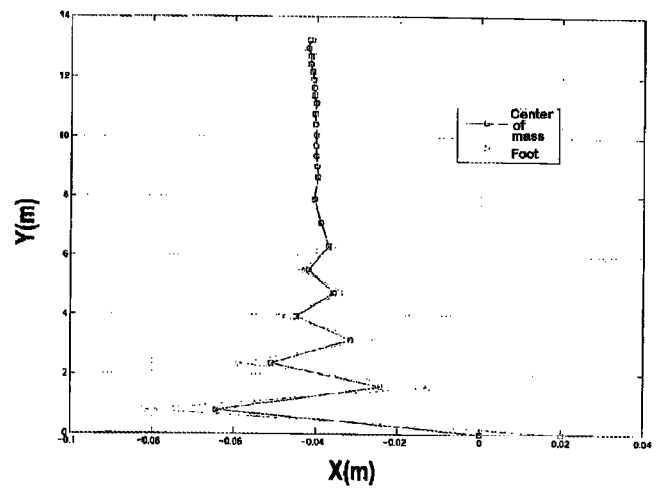
FIGS. 20 to 22 show results relating to simulating a fourth movement of a robot in the second implementation of the invention.
Figure 21:
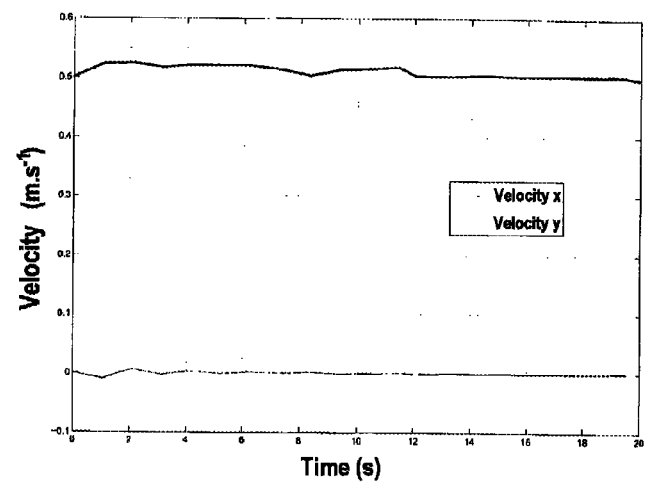
Figure 22:
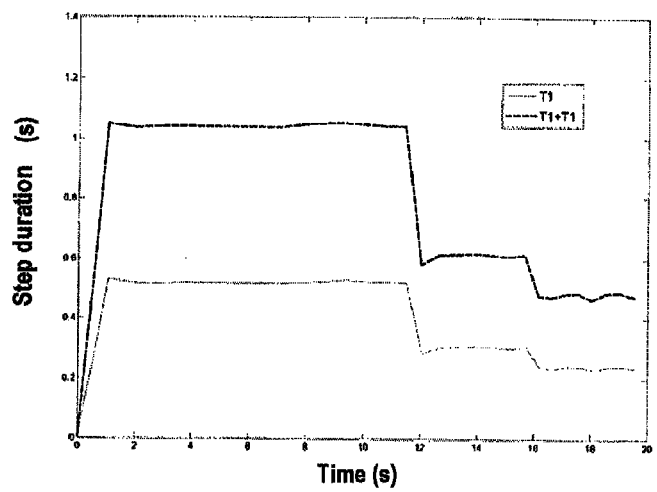

FIGS. 20 to 22 show the results obtained with the method of FIG. 19.

The setpoint scenario given to the robot is as follows: it should move along the direction y at 0.5 m·s$^{-1}$. The environment constraints are such that the coefficient of friction initially has the value 1, and changes every 5 s so as to take on successively the values 0.4, 0.3, and 0.2.

FIG. 20 shows the movement of the robot in the plane.

FIG. 21 shows the variation in velocity along the two axes as a function of time. Finally, FIG. 22 shows the variation in step time as a function of time. The step accelerates when the coefficient of friction reaches the value 0.3.

It is specified that the control method of FIG. 8 is four times faster than the control method of FIG. 11. It requires calculation time of 25 milliseconds (ms) per movement step using a dual processor computer, with control being programmed using the Matlab™ language. Such results make it possible to envisage using this control method in an interactive context, or in a real time context.

In a variant, use is made of control that is based on simultaneous use of the control methods of FIGS. 4 and 8.

In certain implementations, instead of measuring the values of the state variables in step 300, they are estimated on the basis of various available items of information.

In certain implementations, instead of optimizing the control variables $\Delta X_f$ and $T_1$, control variables of a complex model are optimized by using the principles described in the implementations relating to the inverted linear pendulum model.

Control based on the proposed modeling must be constituted by at least two control variables in order to guarantee stability for the simple system.

For example, the time $T_1$ may be imposed if the position of the foot is free both in the direction x and in the direction y. In a staircase, if it is necessary to determine the step size in the direction of the staircase (the pitch of the stairs), then the time $T_1$ and the position of the foot in the lateral direction must be free.

If other constraints are to be imposed, it then becomes necessary to consider more than one step. For example, if the positions of the feet are imposed, then the control variable $T_1$ suffices, providing at least two successive steps are taken into consideration in the optimization calculation.

The invention is not limited to the implementation described but it extends to any variant implementations within the ambit of the scope of the claims. In particular, instead of being modeled in the form of an inverted linear pendulum, the robot may be modeled in the form of a compass type system, i.e. having a center of mass that is connected to at least two feet via legs of constant length.

Likewise, the robot may have more than two legs, for example may have four legs. In one implementation, it travels continuously with a single leg placed on the ground and three legs off the ground. In another implementation, it travels with a plurality of legs placed on the ground and one or more legs off the ground. Under such circumstances, between two changes of legs, the center of pressure on the ground is stationary. The changes of leg are thus changes in the center of pressure on the ground. The notion of leg change then covers not only pressing one leg in contact with the ground while simultaneously taking another leg out of contact, but also putting a leg into contact with the ground without simultaneously taking another leg out of contact, and also taking a leg out of contact without simultaneously putting another leg into contact, providing that there is always at least one leg in contact with the ground.

The invention claimed is:

1. A method of controlling motion on the ground of a device having at least two legs comprising:
   obtaining current values of dynamic state variables of the device;
   an optimization of a movement command for the device under constraints based at least partially on said current values and a movement setpoint for the device, said optimization being performed by modeling a movement of the device between a current state and a second state, the device being supported during said movement by at least a first leg, in the current state, and during an instant in which a center of pressure of the device on the ground is changed, the device being supported by at least a second leg, in the second state;
   applying said movement command; and
   controlling the device based on said movement command;
   wherein said optimization is performed based at least partially on an assumption that the gravitational potential energy of the device in the second state is a local maximum as a function of time.

2. A control method according to claim 1, wherein the device is modeled in the form of an inverted linear pendulum.

3. A control method according to claim 1, wherein the movement command comprises a position on the ground for contact between a leg and the ground.

4. A control method according to claim 1, wherein the movement command comprises a time for contact between a leg and the ground.

5. A control method according to claim 1, wherein said optimization is performed by using a movement model that is linearized based at least partially on an assumption that the movement is rectilinear.

6. A control method according to claim 5, wherein the optimization is performed with the help of a linear quadratic regulator.

7. A control method according to claim 1, wherein the optimization is performed by model inversion.

8. A control method according to claim 1, wherein the optimization is performed as a function of a setpoint determined as a function of a trajectory to be followed.

9. A control method according to claim 1, wherein the optimization is performed as a function of a setpoint that is determined as a function of a velocity to be followed.

10. A control method according to claim 1, wherein the optimization is performed under a constraint of complying with a friction cone during a contact of a leg with the ground.

11. A control method according to claim 1, wherein the optimization is performed as a function of a setpoint including at least one position of the device or at least one velocity of the device.

12. A control method according to claim 1, wherein the optimization is performed as a function of an average step length setpoint.

13. A control method according to claim 1, wherein the gravitational potential energy of the device is calculated as a function of the distance between the center of mass and the point of contact with the ground of the leg that is in contact with the ground.

14. A robot, comprising:
   at least two legs; and
   a control device,
   wherein said control device performs a control method comprising the steps of:
   obtaining current values of dynamic state variables of the device;
   an optimization of a movement command for the device under constraints based at least partially on said current values and a movement setpoint for the device, said optimization being performed by modeling a movement of the device between a current state and a second state, the device being supported during said movement by at least a first leg, in the current state, and during an instant in which a center of pressure of the device on the ground is changed, the device being supported by at least a second leg, in the second state; and
   applying said movement command;
   wherein said optimization is performed based at least partially on an assumption that the gravitational potential energy of the device in the second state is a local maximum as a function of time.

* * * * *